US011444702B2

(12) United States Patent
Sadhu et al.

(10) Patent No.: US 11,444,702 B2
(45) Date of Patent: Sep. 13, 2022

(54) TRANSMITTER IDENTIFICATION BASED ON MACHINE LEARNING

(71) Applicant: International Business Machines Corporation, Armonk, NY (US)

(72) Inventors: Bodhisatwa Sadhu, Peekskill, NY (US); Supriyo Chakraborty, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 16/836,122

(22) Filed: Mar. 31, 2020

(65) Prior Publication Data

US 2021/0306081 A1 Sep. 30, 2021

(51) Int. Cl.
*G06N 3/08* (2006.01)
*H04B 17/10* (2015.01)
*H04B 7/155* (2006.01)
*H04B 17/12* (2015.01)

(52) U.S. Cl.
CPC ............. *H04B 17/104* (2015.01); *G06N 3/08* (2013.01); *H04B 7/15521* (2013.01); *H04B 17/12* (2015.01)

(58) Field of Classification Search
CPC ....................................................... G04N 3/08
USPC ......................................................... 370/252
See application file for complete search history.

(56) References Cited

U.S. PATENT DOCUMENTS

| 8,249,028 | B2 | 8/2012 | Porras et al. |
| 9,147,153 | B2 | 9/2015 | Sayyar-Rodsari et al. |
| 10,043,259 | B2 | 8/2018 | Reunanen |
| 10,271,233 | B2 | 4/2019 | Kleinbeck et al. |
| 2004/0258356 | A1* | 12/2004 | Brice ............... G02B 6/29329 385/37 |
| 2017/0238304 | A1* | 8/2017 | Ling .................. H04L 5/0037 370/336 |
| 2019/0114307 | A1 | 4/2019 | Stefanovici et al. |
| 2020/0068398 | A1 | 2/2020 | Chakraborty et al. |

FOREIGN PATENT DOCUMENTS

CN 104918249 A 9/2015

OTHER PUBLICATIONS

Wong, L. J., et al., "Specific Emitter Identification Using Convolutional Neural Network-Based IQ Imbalance Estimators", IEEE Access, date of current version Mar. 29, 2019, pp. 33544-33555, vol. 7.

(Continued)

*Primary Examiner* — Dang T Ton
(74) *Attorney, Agent, or Firm* — Scully, Scott, Murphy & Presser, P.C.; Daniel P. Morris

(57) ABSTRACT

Systems and methods for identifying a device are described. In an example, a processor can receive a first signal having a first waveform encoding data. The processor can extract the data from the first signal. The processor can determine a transformation being used to encode the data in the first waveform. The processor can generate a second signal using the determined transformation to encode the data in a second waveform. The processor can determine a difference between the first waveform and the second waveform. The processor can identify a device as a candidate device that sent the first signal, based on the determined difference.

20 Claims, 4 Drawing Sheets

(56) References Cited

OTHER PUBLICATIONS

McGinthy, J. M., "Groundwork for Neural Network-Based Specific Emitter Identification Authentication for IoT", IEEE Internet of Things Journal, Aug. 2019, pp. 6429-6440, vol. 6, No. 4.
Merchant, K., et al., "Deep Learning for RF Device Fingerprinting in Cognitive Communication Networks", IEEE Journal of Selected Topics in Signal Processing, Feb. 2018, pp. 160-167, vol. 12, No. 1.
Chatterjee, B., et al., "RF-PUF: Enhancing IoT Security Through Authentication of Wireless Nodes Using In-Situ Machine Learning", IEEE Internet of Things Journal, Feb. 2019, pp. 388-398, vol. 6, No. 1.

* cited by examiner

US 11,444,702 B2

TRANSMITTER IDENTIFICATION BASED ON MACHINE LEARNING

BACKGROUND

The present application relates generally to wireless communication technologies. In one aspect, the present application relates particularly to transmitter identification based on machine learning.

Multiple transmitters can be implemented in a communication network to facilitate wireless communication of data. In some examples, these transmitters can be identical such as having same hardware components, constructed by the same manufacturing process, having same functionalities, and/or sharing other common properties. Various authentication schemes can be utilized to distinguish and identity these transmitters from one another.

BRIEF SUMMARY

In some examples, a method for identifying a device is generally described. The method can include receiving a first signal having a first waveform encoding data. The method can further include extracting the data from the first signal. The method can further include determining a transformation being used to encode the data in the first waveform. The method can further include generating a second signal using the determined transformation to encode the data in a second waveform. The method can further include determining a difference between the first waveform and the second waveform. The method can further include identifying a device as a candidate device that sent the first signal, based on the determined difference.

In some examples, a system for identifying a device is generally described. The system can include a receiver and a device. The receiver can be configured to receive a first signal from a transmitting device, the first signal can have a first waveform encoding data. The device can be configured to be in communication with the receiver. The device can be configured to extract the data from the first signal. The device can be further configured to determine a transformation being used to encode the data in the first waveform. The device can be further configured to generate a second signal using the determined transformation to encode the data in a second waveform. The device can be further configured to determine a difference between the first waveform and the second waveform. The device can be further configured to identify the transmitting device based on the determined difference.

In some examples, a computer program product for identifying a device is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

Figure 1:
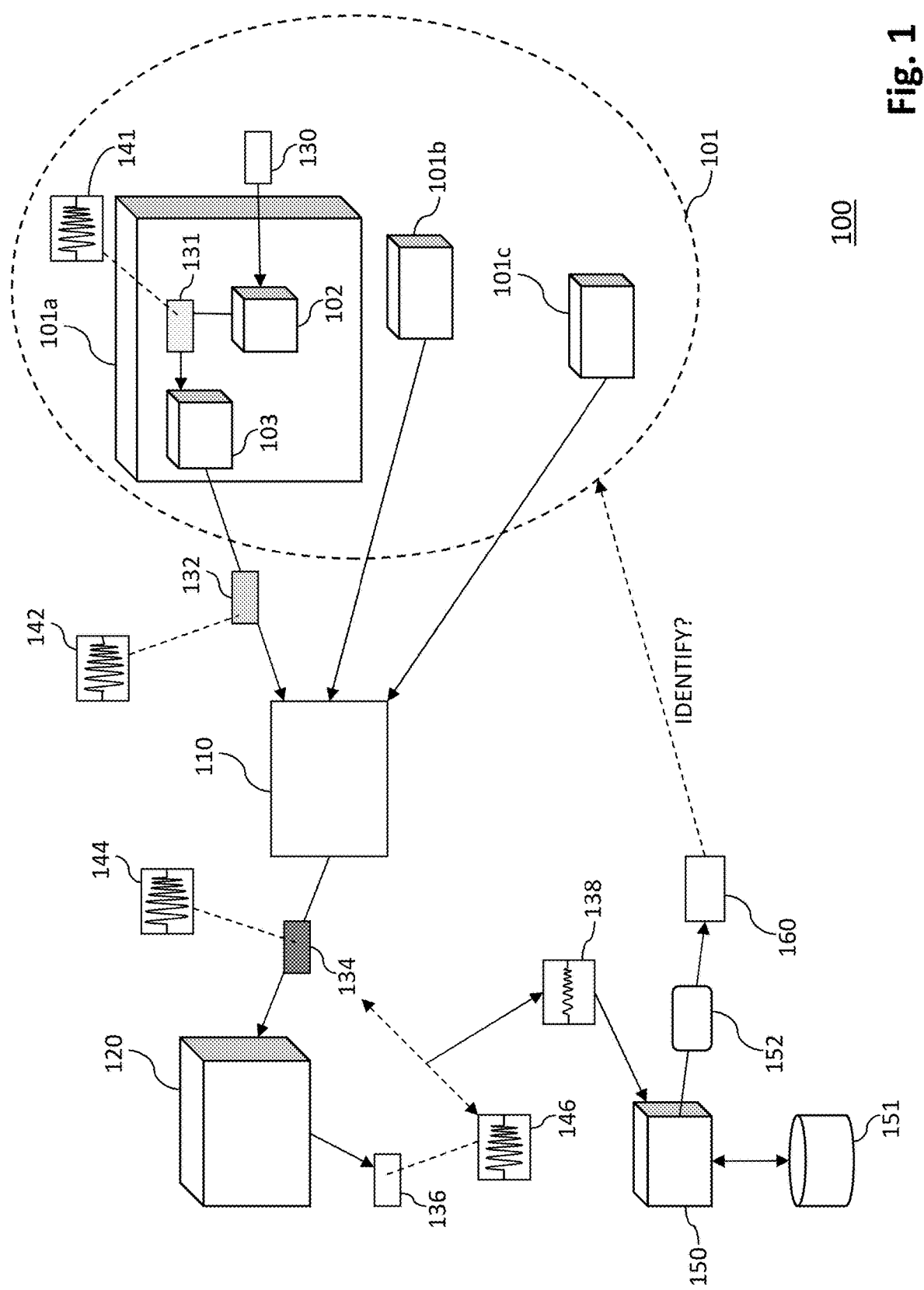
FIG. 1 is a diagram showing an example system that can implement transmitter identification based on machine learning in one embodiment.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following descriptions, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when a first element is connected to a second element, the first and second elements can be operatively connected, communicatively connected, directly connected, or indirectly connected (e.g., with other components in-between).

Some communication networks may implement identical transmitters. However, these identical transmitters can behave differently from each other due to imperfections or non-idealities in the hardware components of the transmitters. For example, different levels of imperfections between different transmitters can introduce different amounts of noise to signals being transmitted by these transmitters.

FIG. 1 is a diagram showing an example system 100 that can implement transmitter identification based on machine learning in one embodiment. The system 100 can be a wireless communication system. The system 100 can include a plurality of devices 101 (or candidate devices), a device 120, and a device 150. The plurality of devices 101 can be configured to be in communication with the device 120 through a channel 110. The channel 110 can be a wireless communication channel. The plurality of devices 101 can be devices that are configured to transmit modulated signals to the device 120 through the channel 110. The modulated signals transmitted by the plurality of devices 101 can include respective waveforms encoding data. The plurality of devices 101 can include transmitters and/or transceivers. The device 120 can be a device, such as a receiver, configured to receive modulated signals transmitted by at least one of the plurality of devices 101. The device 150 can be a computer device including at least a processor and a memory 151. The device 150 can be configured to be in communication with the device 120.

In an example shown in FIG. 1, the plurality of devices 101 can include at least a device 101a, a device 101b, and a device 101c. Focusing on the device 101a as an example, the device 101a can receive a baseband signal representing data 130, where the data 130 can be a bit vector representing, for example, a message, image data, and/or other types of data. The device 101a can transform the data 130 into a signal having a waveform encoding the data 130. For example, the device 101a can include a modulator 102 configured to modulate at least one carrier frequency using the data 130 to generate a modulated signal 131. The modulated signal 131 can have a waveform 141 encoding the data 130. The device 101a can further include an antenna 103 configured to transmit the modulated signal 131 to another device, such as the device 120. The imperfections or non-idealities of the hardware components (e.g., circuit components) of the device 101a can cause a non-linear transformation to be applied to the modulated signal 131. This non-linear transformation can transform the modulated signal 131 into another modulated signal 132 having a waveform 142. The waveform 142 can encode the data 130. The waveform 142 can be a combination of the waveform 141 and noises caused by the non-idealities in the hardware components of the device 101a.

The antenna 103 of the device 101a can transmit the modulated signal 132 to the device 120 through the channel 110. In some examples, the channel 110 can apply a transformation (e.g., a linear transformation) on the modulated signal 132. This linear transformation can transform the modulated signal 132 to another modulated signal 134 having a waveform 144. The waveform 144 can encode the data 130. The waveform 144 can be a combination of the waveform 142 and noises caused by the linear transformation performed by the channel 110. In some examples, the transformation by the channel 110 can be a time-varying function depending on the placements and environments of the channel 110 at a transmission time of the modulated signal 132.

The device 120 can receive the modulated signal 134. The device 120 can perform demodulation to extract the data 130 from the modulated signal 134. In some examples, non-idealities of imperfections of the hardware components of the device 120 can also applied additional non-linear transformation on the received modulated signal 134. The extracted version of the data 130 may be different from the data 130 originally received by the device 101a. This difference can be caused by noises added from the transformations applied by the device 101a, the channel 110, and/or the device 120. The device 120, sometimes in combination with the transmitting device (e.g., 101a), can be configured to apply various error correction techniques to recover the data 130. Some examples of error correction techniques include, but are not limited to, forward error correction, using parity bits, checksums, cyclic redundancy checks, error correcting codes, and other types of error correction techniques.

The device 120 can determine a transformation that was used to transform the data 130 into the modulated signal 131. For example, the device 120 can determine a difference between a waveform of the extracted data and the waveform 144 to determine the amplitude and phase of the at least one carrier frequency that was used in the modulation performed by the device 101a. The device 120 can generate a modulated signal 136 having a waveform 146, where the waveform 146 encodes the data 130 recovered by the device 120. In an example, the waveform 146 can be substantially identical to the waveform 141, but different from the waveform 144 due to the transformations caused by the device 101a, the channel 110, and the device 120. The device 120 can generate the modulated signal 136 by modulating the determined carrier frequency using the data 130 recovered by the device 120. The device 120 can compare the modulated signal 136 with the received modulated signal 134 to determine a differential signal, where the differential signal can have a differential waveform 138 representing the difference between the waveform 144 and the waveform 146. The differential waveform 138 can reflect effects of the transformations caused by the device 101a, the channel 110, and the device 120 on the modulated signal 131.

The device 120 can send the differential waveform 138 to the device 150. The device 150 can use the differential waveform 138 to identify the device 101a among the plurality of devices 101. For example, the device 150 can run a machine learning model 152 to generate an output 160. The output 160 from the machine learning model 152 can be used to identify the device (e.g., device 101a) that transmitted the modulated signal 134 received at the device 120. Further, the device 120 can also send the recovered data 130 and the determined carrier frequency to the device 150, and the device 150 can train the machine learning model 152 using the differential waveform 138, the data 130, and the determined carrier frequency.

In an example embodiment, the output 160 can include probabilities corresponding to the plurality of devices 101, where each probability among the output 160 can indicate a likelihood that a corresponding device transmitted the received modulated signal 134. For example, the output 160 can include the probabilities 98.5% for the device 101a, 0.75% for the device 101b, and 0.75% for the device 101c. The device 150 can determine that the device 101a has the greatest probability of being the device that transmitted the modulated signal 134. In some example, the output 160 can return an output that fails to identify any transmitting device. The processor 150 can determine that the device 101a can be a previously unknown device and assign a new identification to the device 101a using the differential waveform 138.

In an example embodiment, the memory 151 can be configured to store data indicating properties (e.g., amplitude, phase, frequency information, etc.) of waveforms corresponding to the device 120 and/or the channel 110. These stored waveform properties can be used as a signatures of the device 120 and the channel 110. For example, a waveform property corresponding to device 120 can indicate that the amplitude can increase by a particular rate at particular frequencies. The device 150 can determine a difference between the differential waveform 138 and these stored waveform properties, and use the determined difference as a signature of the device that transmitted the received modulated signal 134. This signature, which can be a waveform, can be used to run the machine learning model 152 to identify the device 101a. This example embodiment can allow the system 100 to identify a transmitting device when the signatures of a receiving device and the wireless communication channel are known.

Training of the machine learning model 152 using the differential waveform 138, the data 130, and the determined carrier frequency can be based on attention machine learning. Attention machine learning can train models using attention, such as a set of additional parameters that are trained to re-weigh the features in some latent space. The resulting weights can be referred to as attention weights and the re-weigh can allow the model to provide greater importance to certain extracted features and improve efficiency. The attention weights can also allow the model to be more interpretable, e.g., looking at the attention weights the end user can better understand which features were the most responsible for a particular decision made by the neural network. The differential waveform 138, or the difference signal, can be interpreted as an explicit attention that is being input to the model 152. In an example, one instantiation can be to initialize the attention parameters with the difference signal and update them during training. In some examples, the initialization using appropriate set of attention parameters can allow the attention parameters to converge faster and speed up training.

Figure 2:
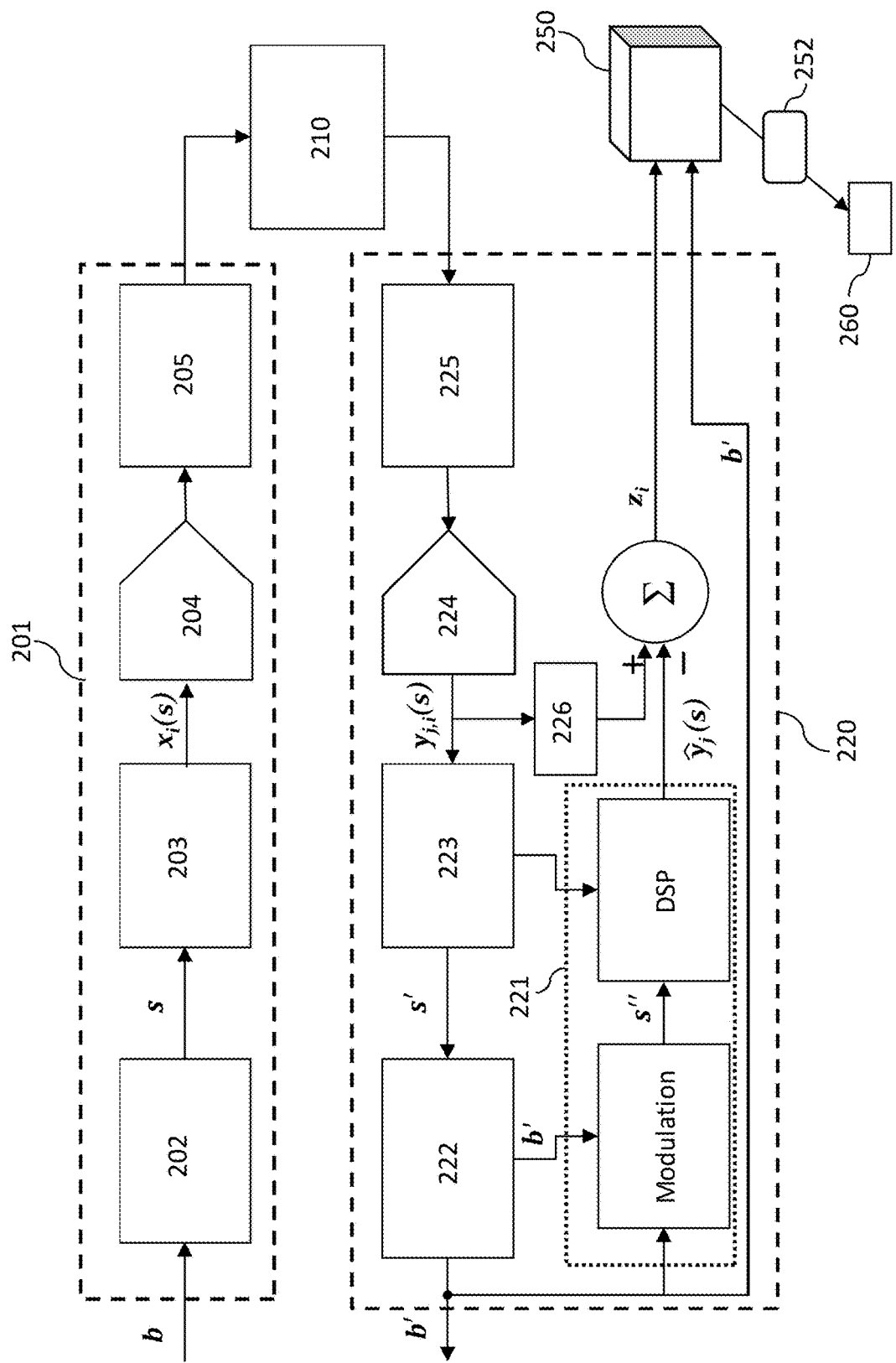
FIG. 2 is a diagram showing an embodiment of transmitter identification based on machine learning.

FIG. 2 is a diagram showing an embodiment of transmitter identification based on machine learning. A system 200 can be a wireless communication system. The system 200 can include a device 201, a device 220, and a device 250. The device 201 can be configured to be in communication with the device 220 through a channel 210. The channel 210 can be a wireless communication channel. The device 201 can be a transmitting device, such as a transmitter or a transceiver, configured to transmit modulated signals to the device 220 through the channel 210. The modulated signals transmitted by the devices 201 can include a waveform encoding data. The device 220 can be a receiving device, such as a receiver, configured to receive modulated signals transmitted by the device 201. The device 250 can be a computer device including at least a processor and a memory. The device 250 can be configured to be in communication with the device 220.

In an example shown in FIG. 2, the device 201 can receive a baseband signal representing data denoted as b. The data b can be a bit vector including bits b, and can represent, for example, a message, image data, and/or other types of data. The device 201 can include a modulator 202 configured to modulate at least one carrier frequency using the data b to generate a modulated signal having a symbol vector denoted as s. The symbol vector s can be a symbol vector including symbols s of the modulated signal (e.g., an orthogonal frequency-division multiplexing (OFDM) signal) from the modulation of the carrier frequency using the data b. The device 201 can further include a digital signal processor (DSP) 203 configured to generate a digital waveform denoted as $x_i$, where $x_i(s)$ denotes the waveform $x_i$ encoding or modulated by the symbol vector s, $x_i(b)$ denotes the waveform $x_i$ encoding or modulated by the bit vector b, and the index i in $x_i(s)$ is an identification of the device 201. The waveform $x_i$ can be a discretized or quantized sequence of values, and $x_i$ can be a complex waveform including an in-phase (I) component and a quadrature-phase (Q) component that are mapped onto real and imaginary parts of each symbol s.

The modulated signal with the waveform $x_i$ can be fed into a digital-to-analog converter (DAC) 204 to be converted to an analog signal. The waveform $x_i$ can be transmitted by an antenna 205 to the device 220 through the channel 210. The imperfections or non-idealities of hardware components (e.g., circuit components) of the device 201 can cause a non-linear transformation, denoted as $T_i(\cdot)$, to be applied to the waveform $x_i$. Also, the channel 210 can cause a linear transformation, denoted as $H_{ij}(\cdot)$, to be applied to the waveform $x_i$, where the index j identifies the receiving device 220.

An antenna 225 of the device 220 can receive the transmitted waveform $x_i$, and imperfections or non-idealities of hardware components (e.g., circuit components) of the device 220 can cause a non-linear transformation, denoted as $R_j(\cdot)$, to be applied to the waveform $x_i$. Upon going through the transformations $T_i(\cdot)$, $H_{ij}(\cdot)$, and $R_j(\cdot)$, the signal received at the device 220 can have a waveform denoted as $y_{i,j} = T_i \cdot H_{ij} \cdot R_j \cdot (x_i)$. In an example, the non-linear transformations $T_i$ and $R_j$ can include fixed invariants for a given transmitter-receiver pair (e.g., transmitter device i and receiver device j), while the channel effect or linear transformation $H_{ij}$ can be a time-varying function depending on the placements and environments of the of the wireless channel 210 at a transmission time of the waveform $x_i$.

The received waveform $y_{j,i}$ can be fed to an analog-to-digital converter (ADC) 224 of the device 220. The ADC 224 can output the digital waveform $y_{j,i}(s)$, where $y_{j,i}(s)$ denotes the waveform $y_{j,i}$ encoding the symbol vector s. The device 220 can include a digital signal processor (DSP) 223 configured to recover a modulated signal having a symbol vector s', where the symbol vector s' can be different from the symbol vector s due to the transformations $T_i(\cdot)$, $H_{ij}(\cdot)$, and $R_j(\cdot)$. The device 220 can include a demodulator 222 configured to demodulate or decode the modulated signal having the symbols s' to extract a bit vector b' having a series of bits b'. The bit vector b' can be different from the bit vector b due to the transformations $T_i(\cdot)$, $H_{ij}(\cdot)$, and $R_j(\cdot)$.

The device 220 can include a reconstructor 221 configured to perform modulation using the extracted bit vector b' and the determined transformation to generate a modulated signal having a symbol vector s". The symbol vector s" can be different from the symbol vector s due to the difference between b' and b. The reconstructor 221 can include a DSP unit configured to generate a nominal waveform, $\hat{y}_j(s)$ using the symbol vector s". By using the reconstructor 221 to attempt reconstructing a waveform identical to the waveform $x_i(s)$, this nominal waveform $\hat{y}_j(s)$ can be independent of noises caused by the transformations $T_i(\cdot)$, $H_{ij}(\cdot)$, and/or $R_j(\cdot)$. The reconstructor 221 can use feedback from the DSP 223 and demodulator 222 to produce a linearly transformed version of the reconstructed signal $\hat{y}_j(s)$ to closely match the incoming signal $y_{j,i}(s)$.

Since the DSP 223 and demodulator 222 already performed channel estimation during demodulation of s', the results from the channel estimation can be used by the reconstructor 221 to apply real time channel effects so that the reconstructed waveform $\hat{y}_j(s)$ can be more closely matched to the received waveform $y_{j,i}(s)$. The device 220 can further include a circuit 226 that can apply a delay on the received waveform $y_{j,i}(s)$ to match with the phases of the reconstructed waveform $\hat{y}_j(s)$. The device 220 can include a circuit 227 (e.g., a digital subtractor) configured to determine a difference between the waveforms $\hat{y}_j(s)$ and the delayed version of $y_{j,i}(s)$ to produce $z_i = y_{j,i} - \hat{y}_j$, where $z_i$ denotes a differential waveform. The differential waveform $z_i$ can be a difference between the received waveform $y_{j,i}$ and the reconstructed waveform $\hat{y}_j$. In an example, the differential waveform $z_i$ can represent a corruption of the waveform $x_i$ in the transmission chain from the device 201 to the device 220, where the corruptions include channel distortion caused by the transformation $H_{ij}(\cdot)$ in the channel 210 and noise corruptions caused by the transformations $T_i(\cdot)$, and $R_j(\cdot)$.

The device 220 can send the differential waveform $z_i$ to the device 250. The device 250 can use the differential waveform $z_i$ to identify the device 201 among a plurality of devices. For example, the device 250 can run a machine learning model 252 to generate an output 260. The output 260 from the machine learning model 252 can be used to identify the device 201 that transmitted the modulated signal with the received waveform $y_{j,i}$. Further, the device 220 can also send the recovered bit vector b', and/or the carrier frequency determined from the demodulation performed by the demodulator 222, to the device 250. The device 250 can train the machine learning model 252 using the differential waveform $z_i$, the bit vector b', and the determined carrier frequency.

In an example embodiment, the output 260 can include probabilities corresponding to a plurality of devices, where each probability among the output 260 can indicate a likelihood that a corresponding device transmitted the modulated signal with the received waveform $y_{j,i}$. For example, the output 260 can include a probability 98.5% for the device 201, and can determine that the device 201 has the greatest probability of being the device that transmitted the modulated signal with the received waveform $y_{j,i}$.

In an example to train the machine learning model 252, the device 250 can be given a relatively large training data set that includes (i) a collection of waveforms $Y=\{y^{(1)}, y^{(2)}, \ldots, y^{(m)}\}$, where each $y^{(k)}$ can be a waveform at the receiver (e.g., device 220), reconstructed from a waveform transmitted by a transmitter device (e.g., device 201) in a set $N=\{1, 2, \ldots, n\}$, and (ii) an identification (ID) of the device (i.e., one in the set N) that sent each $y^{(k)}$ in Y. Each $y^{(k)}$ can be expressed as $y^{(k)}=y_i(s_l)=T_i \cdot H_i \cdot R (x_i(s_l))$, where $s_l$ denotes the original sequence of symbols at the transmitter, $x_i(s_l)$ denotes the waveform that encodes $s_l$, and the transformation functions $T_i(\cdot)$, $H_{ij}(\cdot)$, and/or $R_j(\cdot)$ are unknown, but the ID (index i) of the transmitter of $y^{(k)}$ is known. A goal of training the machine learning model 252 is to estimate an ID mapping function $\hat{M}:Y \to N$ from the training data set, and apply the estimated mapping function to a new, previously unknown waveform data sample of y, to predict the transmitter device of y. An additional requirement is to map a new y to a previously unknown transmitter device not in the training set N, and assign a new ID to the newly discovered transmitter.

To train the machine learning model 252, the device 250 can learn unique features of each transmitter device i based on the at least a subset of the waveforms $Y_i$. Distinguishing each transmitter device i from other transmitter devices can include identifying the differentiating characteristics of the effects caused by the non-idealities of the transmitter devices' hardware (e.g., the transformation $T_i(\cdot)$), on the waveforms $x_i$ originated from transmitter device i, regardless of the effect of the linear channel $H_{ij}(\cdot)$. The non-idealities of the receiver's hardware, such as the transformation $R_j(\cdot)$, can be ignored if there is a single receiver device j. If there are more than one receiver device, the device 250 can train the machine learning model 252 to learn transmitter-receiver pairwise signatures.

In an example, to estimate the ID mapping function $\hat{M}$, the first part of training data set Y can be in its raw radio frequency (RF) waveform format that can have relatively large data volume. Further, the training data set can be in complex-valued I/Q data format (e.g., having both I and Q components). The training of the machine learning model 252 can be based on the received waveforms $y_i$ instead of the original waveform $x_i$, causing difficulty in isolating the effects of the transformations $T_i(\cdot)$, $H_{ij}(\cdot)$, and/or $R_j(\cdot)$. The signal-to-noise ratio (SNR) in the training data set can be low, causing difficulty in discriminating features of the transmitting device from the received waveform. Furthermore, different transmitter hardware can cause changes to different properties at different regions of the waveform depending on the specific time-varying pattern of the waveform it operates on.

The reconstruction the waveform $\hat{y}_j(s)$, described above, can address the difficulty in discriminating features of the transmitting device from the received waveform. In an example embodiment, a first portion of the digital waveform $y_{j,i}(s)$ can represent the data being encoded (e.g., the symbol vector s), and a second portion of the digital waveform $y_{j,i}(s)$ can represent noise added by the transformations $T_i(\cdot)$, $H_{ij}(\cdot)$, and $R_j(\cdot)$. The first portion representing the data being encoded can be relatively large (e.g., in data volume) when compared to the second portion. For example, the first portion can represent a large interferer signal on top of a smaller signal (e.g., the second portion), causing the digital waveform $y_{j,i}(s)$ to have undesirable signal to interference ratio (SIR). The device 220 can perform SIR cancelation by reconstructing the nominal waveform $\hat{y}_j(s)$, using the series of bits denoted as b' decoded from the received waveform $y_{j,i}(s)$. Further, the device 220 can further determine a transformation that was used to transform the bit vector b into the symbol vector s. For example, the device 220 can determine amplitude and phase of the at least one carrier frequency that was used by the modulator 202. By reconstructing the received waveform and determining the differential waveform $z_i$, the processor 250 can train the machine learning model 252 using a smaller training data set (e.g., differential waveforms $z_i$) instead of the training data set Y.

In another example, to address the large data volume, the system 200 can break up the entire received waveform $y_{j,i}(s)$ into overlapping time slices whose length depends on the maximum duration of non-linearity signatures. The slicing of the waveform data needs to take into account two different types of non-linearity signatures: (i) short-term, atomic signatures that occur due to non-idealities in the transmission hardware, such as amplitude clipping and power amplifier non-linearity caused by the transformation $T_i(\cdot)$, and (ii) longer-term effects such as frequency drift and mismatch as well as quadrature phase errors. There can be other types of signatures that can occur at both short- and longer-term time scale, such as spurious frequency tones. The processor 250 can apply convolutional feature encoding schemes on the short-term/atomic signatures, and long short-term memory (LSTM) techniques to the longer-term signatures.

Figure 3:
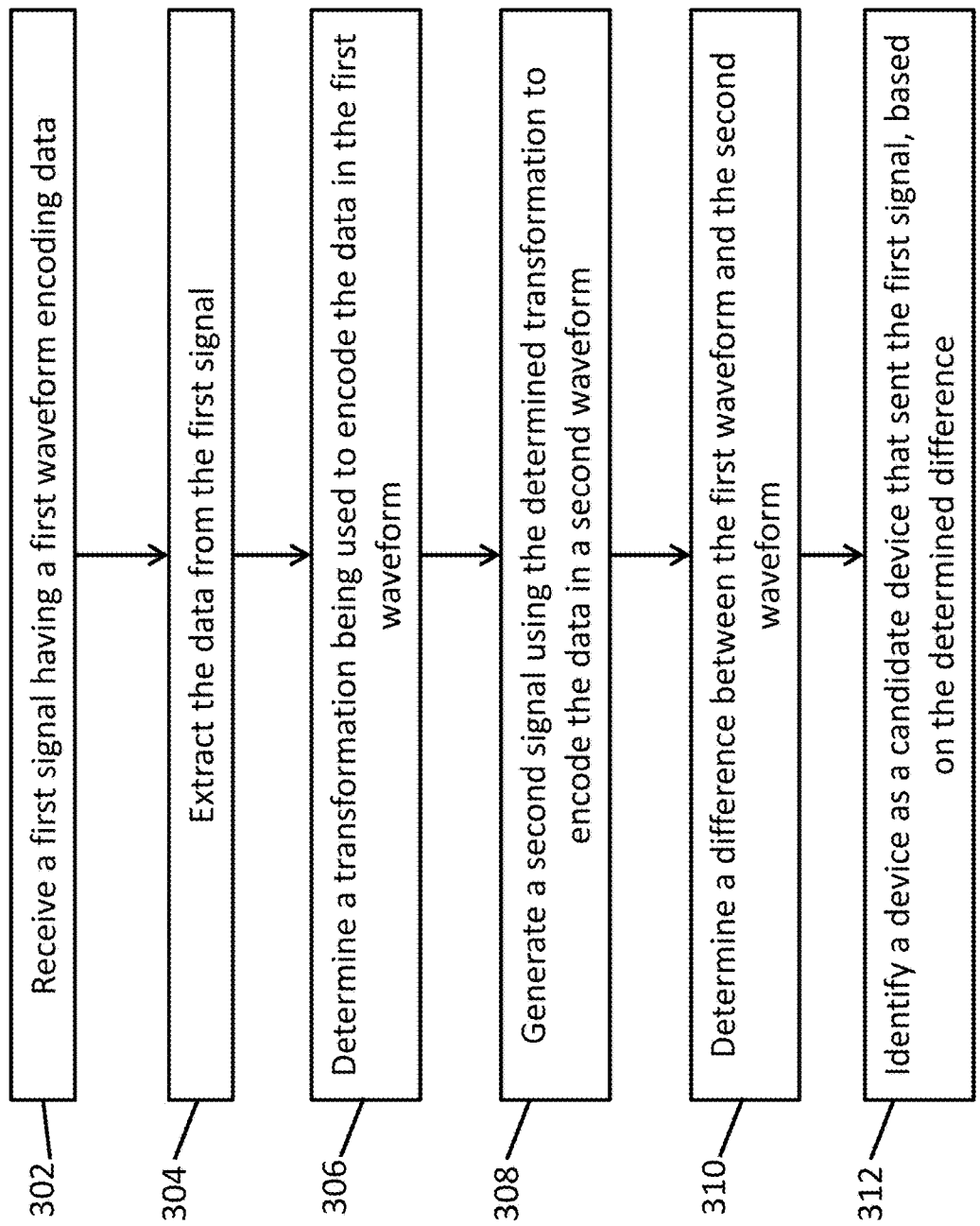
FIG. 3 is a flow diagram illustrating another process to implement transmitter identification based on machine learning in one embodiment.

FIG. 3 is a flow diagram illustrating a process 300 to implement transmitter identification based on machine learning in one embodiment. An example process may include one or more operations, actions, or functions as illustrated by one or more of blocks 302, 304, 306, 308, 310, and/or 312. Although illustrated as discrete blocks, various blocks can be divided into additional blocks, combined into fewer blocks, eliminated, or performed in parallel, depending on the desired implementation.

The process can begin at block 302. At block 302, a processor can receive a first signal having a first waveform encoding data. The process 300 can continue from block 302 to block 304. At block 304, the processor can extract the data from the first signal. The process 300 can continue from block 304 to block 306. At block 306, the processor can determine a transformation being used to encode the data in the first waveform. The process 300 can continue from block 306 to block 308. At block 308, the processor can generate a second signal using the determined transformation to encode the data in a second waveform. The process 300 can continue from block 308 to block 310. At block 310, the processor can determine a difference between the first waveform and the second waveform. The process 300 can continue from block 310 to block 312. At block 312, the processor can identify a device as a candidate device that sent the first signal, based on the determined difference.

In some examples, the difference can indicate at least one of: non-ideality associated with hardware components of the device; non-ideality associated with hardware components of a device receiving the first signal; and at least one error caused by the transmission of the first signal over a wireless channel. In some examples, identifying the device can include running a machine learning model using the determined difference to output a probability indicating a likelihood that the first signal was transmitted by the device. In some examples, in response to an absence of an identification of the device in the output from the machine learning model, the processor can assign a new signature to the device using the determined difference. In some examples, the processor can further train a machine learning model based on attention machine learning by initializing attention parameters using the difference. In some examples, the processor can apply a delay to the first signal, and determining the difference can include determining a difference between the first signal and the delayed version of the second signal.

Figure 4:
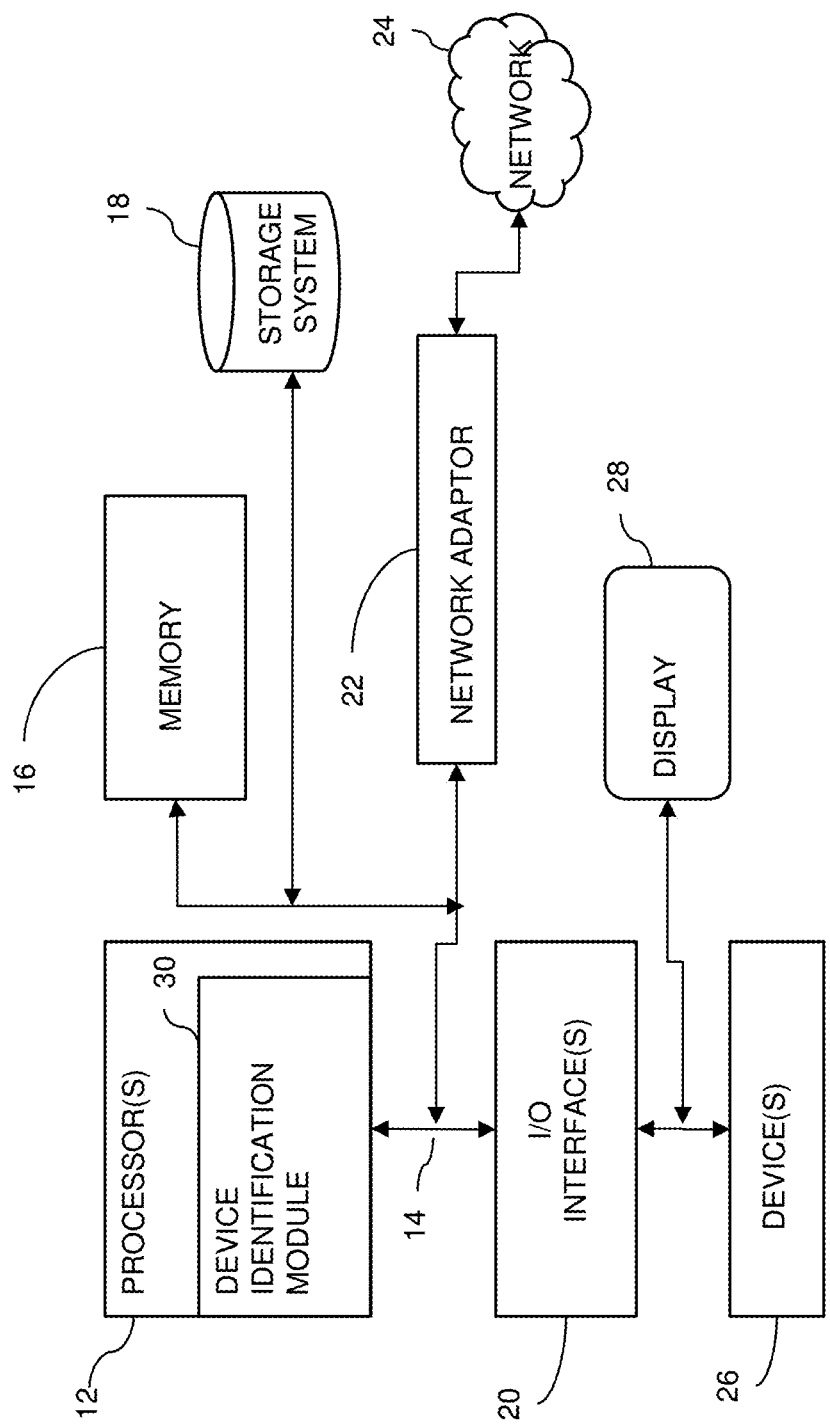
FIG. 4 illustrates a schematic of an example computer or processing system that can implement transmitter identification based on machine learning in one embodiment of the present disclosure.

FIG. 4 illustrates a schematic of an example computer or processing system that can implement transmitter identification based on machine learning in one embodiment of the present disclosure. The computer system is only one example of a suitable processing system and is not intended to suggest any limitation as to the scope of use or functionality of embodiments of the methodology described herein. The processing system shown can be operational with numerous other general purpose or special purpose computing system environments or configurations. Examples of well-known computing systems, environments, and/or configurations that can be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system can be described in the general context of computer system executable instructions, such as program modules, being executed by a computer system. Generally, program modules may include routines, programs, objects, components, logic, data structures, and so on that perform particular tasks or implement particular abstract data types. The computer system can be practiced in distributed cloud computing environments where tasks are performed by remote processing devices that are linked through a communications network. In a distributed cloud computing environment, program modules can be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., device identification module 30) that performs the methods described herein. The module 30 can be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media can be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces. In some examples, the system memory 16 can include a structure including one or more capacitive processing units as described herein.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention can be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving a first signal having a first waveform encoding data representing a bit vector;
demodulating the first signal to extract the bit vector from the first signal;
determining a transformation being used to encode the data in the first waveform;
generating a second signal using the determined transformation to encode the extracted bit vector in a second waveform, wherein the generated second signal is an attempt to reconstruct the first signal;
determining a difference between the first waveform and the second waveform; and
identifying a device as a candidate device that sent the first signal, based on the determined difference.

2. The method claim 1, wherein the difference indicates at least one non-ideality associated with hardware components of the device.

3. The method of claim 1, wherein identifying the device comprises, running a machine learning model using the determined difference to output a probability indicating a likelihood that the first signal was transmitted by the device.

4. The method of claim 3, in response to an absence of an identification of the device in the output from the machine learning model, assigning a new signature to the device using the determined difference.

5. The method of claim 1, further comprising training a machine learning model based on attention machine learning by initializing attention parameters using the difference.

6. The method of claim 1, wherein the difference indicates at least one of:
non-ideality associated with hardware components of the device;
non-ideality associated with hardware components of a device receiving the first signal; and
at least one error caused by the transmission of the first signal over a wireless channel.

7. The method of claim 1, further comprising applying a delay to the first signal, and determining the difference comprises determining a difference between the delayed version of the first signal and the second signal.

8. A system comprising:
a receiver configured to receive a first signal from a transmitting device, the first signal having a first waveform encoding data representing a bit vector;
a device configured to be in communication with the receiver, the device being configured to:
demodulate the first signal to extract the bit vector from the first signal;
determine a transformation being used to encode the data in the first waveform;
generate a second signal using the determined transformation to encode the extracted bit vector in a second waveform, wherein the generated second signal is an attempt to reconstruct the first signal;
determine a difference between the first waveform and the second waveform; and
identify the transmitting device based on the determined difference.

9. The system of claim 8, wherein the difference indicates at least one non-ideality associated with hardware components of the transmitting device.

10. The system of claim 8, wherein the device is configured to run a machine learning model using the determined difference to output a probability indicating a likelihood that the first signal was transmitted by the transmitting device.

11. The system of claim 10, in response to an absence of an identification of the transmitting device in the output from the machine learning model, assigning a new signature to the transmitting device using the determined difference.

12. The system of claim 8, wherein the device is configured to train a machine learning model based on attention machine learning by initializing attention parameters using the difference.

13. The system of claim 8, wherein the difference indicates at least one of:
non-ideality associated with hardware components of the transmitting device;
non-ideality associated with hardware components of the receiver; and
at least one error caused by the transmission of the first signal over a wireless channel.

14. The system of claim 8, wherein the device is configured to apply a delay to the first signal, wherein the determination of the difference comprises a determination of a difference between the delayed version of the first signal and the second signal.

15. A computer program product for identifying a device, the computer program product comprising a non-transitory computer readable storage medium having program instructions embodied therewith, the program instructions executable by a processing element of a device to cause the device to:
receive a first signal having a first waveform encoding data representing a bit vector;
demodulate the first signal to extract the bit vector from the first signal;
determine a transformation being used to encode the data in the first waveform;
generate a second signal using the determined transformation to encode the extracted bit vector in a second waveform, wherein the generated second signal is an attempt to reconstruct the first signal;
determine a difference between the first waveform and the second waveform; and
identify a device as a candidate device that sent the first signal, based on the determined difference.

16. The computer program product claim 15, wherein the difference indicates at least one non-ideality associated with hardware components of the device.

17. The computer program product claim 15, wherein the program instructions is executable by the processing element of the device to cause the device to identify the device by running a machine learning model using the determined difference to output a probability indicating a likelihood that the first signal was transmitted by the device.

18. The computer program product claim 15, wherein the program instructions is executable by the processing element of the device to cause the device to train a machine learning model based on attention machine learning by initializing attention parameters using the difference.

19. The computer program product claim 15, wherein the difference indicates at least one of:
non-ideality associated with hardware components of the device;

non-ideality associated with hardware components of a device receiving the first signal; and at least one error caused by the transmission of the first signal over a wireless channel.

20. The computer program product claim 15, wherein the program instructions is executable by the processing element of the device to cause the device to apply a delay to the first signal, and the determination of the difference comprises determining a difference between the delayed version of the first signal and the second signal.

* * * * *